US011308924B2

(12) United States Patent
Watanabe (10) Patent No.: US 11,308,924 B2
(45) Date of Patent: Apr. 19, 2022

(54) CHORD INFORMATION EXTRACTION DEVICE, CHORD INFORMATION EXTRACTION METHOD AND NON-TRANSITORY COMPUTER READABLE MEDIUM STORING CHORD INFORMATION EXTRACTION PROGRAM

(71) Applicant: YAMAHA CORPORATION, Hamamatsu (JP)

(72) Inventor: Daichi Watanabe, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 231 days.

(21) Appl. No.: 16/807,766

(22) Filed: Mar. 3, 2020

(65) Prior Publication Data
US 2020/0202823 A1    Jun. 25, 2020

Related U.S. Application Data

(63) Continuation of application No. PCT/JP2017/032378, filed on Sep. 7, 2017.

(51) Int. Cl.
*G10G 3/04* (2006.01)
*G10H 1/00* (2006.01)
*G06V 30/413* (2022.01)

(52) U.S. Cl.
CPC ............. *G10G 3/04* (2013.01); *G06V 30/413* (2022.01); *G10H 1/0008* (2013.01); *G10H 2210/086* (2013.01); *G10H 2210/571* (2013.01)

(58) Field of Classification Search
CPC .... G10G 3/04; G06K 9/00456; G10H 1/0008; G10H 2210/086; G10H 2210/571
(Continued)

(56) References Cited

U.S. PATENT DOCUMENTS 5,202,528 A * 4/1993 Iwaooji ................... G10H 1/12
84/616
2015/0096433 A1 * 4/2015 Watanabe .............. G10H 1/361
84/613
(Continued)

FOREIGN PATENT DOCUMENTS

CN    110473507 A  * 11/2019
CN    111052220 A  *  4/2020 ......... G06K 9/00456
(Continued)

OTHER PUBLICATIONS

International Search Report issued in Intl. Appln. No PCT/JP2017/032378 dated Nov. 21, 2017. English translation provided.
(Continued)

*Primary Examiner* — Christina M Schreiber
(74) *Attorney, Agent, or Firm* — Rossi, Kimms & McDowell LLP (57) ABSTRACT

A chord information extraction device includes an acquirer, a score type determiner, an extraction region determiner and a chord information extractor. The acquirer acquires score image data representing a reference score. The score type determiner determines a score type of the reference score from among a plurality of predetermined score types based on the acquired score image data. The extraction region determiner determines a chord extraction region in the reference score based on extraction region information that defines a relationship between a plurality of score types and a chord extraction region from which chord information is to be extracted. The chord information extractor extracts the chord information from the acquired score image data based on the determined chord extraction region.

17 Claims, 9 Drawing Sheets

(58) Field of Classification Search
USPC .......................................................... 84/609
See application file for complete search history.

(56) References Cited

U.S. PATENT DOCUMENTS

| | | | |
|---|---|---|---|
| 2019/0348013 A1* | 11/2019 | Kubita | G10G 1/02 |
| 2020/0175951 A1* | 6/2020 | Desai | G10H 1/368 |
| 2020/0202822 A1* | 6/2020 | Watanabe | G10H 1/0008 |
| 2020/0202823 A1* | 6/2020 | Watanabe | G06K 9/6271 |

FOREIGN PATENT DOCUMENTS

| | | | |
|---|---|---|---|
| JP | S5886695 U | 6/1983 | |
| JP | H11161738 A | 6/1999 | |
| JP | 2007122277 A | 5/2007 | |
| JP | 4702139 B2 * | 6/2011 | |
| JP | 4702139 B2 | 6/2011 | |
| JP | 2014066937 A * | 4/2014 | |
| JP | 2015075575 A | 4/2015 | |
| JP | 2020056938 A * | 4/2020 | ........... G10H 1/0008 |
| JP | 2021026169 A * | 2/2021 | |

OTHER PUBLICATIONS

Written Opinion issued in Intl. Appln. No. PCT/JP2017/032378 dated Nov. 21, 2017.

* cited by examiner

GUITAR TAB SCORE

GUITAR CHORD SCORE

CHORD INFORMATION EXTRACTION DEVICE, CHORD INFORMATION EXTRACTION METHOD AND NON-TRANSITORY COMPUTER READABLE MEDIUM STORING CHORD INFORMATION EXTRACTION PROGRAM

BACKGROUND OF THE INVENTION

Field of the Invention

The present invention relates to a chord information extraction device, a chord information extraction method and a non-transitory computer readable medium storing a chord information extraction program for extracting chord information from image data of a music score.

Description of Related Art

Conventionally, it has been suggested that image data of a score is acquired using a scanner or the like, and various information related to a music piece is extracted from the image data. For example, an electronic musical instrument system constituted by an electronic musical instrument and an image capturing device is described in JP 4702139 B2. The image capturing device includes a scanner, a digital camera or the like, and reads music piece information from a music score printed on a sheet of paper (a printed music score). The music piece information includes setting information such as registration associated with performance of a music piece in addition to regular music score information. The read music piece information is converted into music score image information, and the music score image information is input to an electronic musical instrument. When acquiring the music score image information, the electronic musical instrument converts the music score image information into music piece data by a music score reading process using an image analysis technique to read the data.

BRIEF SUMMARY OF THE INVENTION

Chord information (a chord name, for example) representing a chord in a music piece may be notated on a score. It is required that such chord information notated on a general score is efficiently extracted. In the above-mentioned electronic musical instrument system, a QR code (registered trademark), for example, is provided on a printed music score as setting information, and it is possible to acquire the setting information by reading the QR code (registered trademark). However, because a QR code (registered trademark) needs to be prepared in addition to the general score, it is cumbersome.

An object of the present invention is to provide a chord information extraction device, a chord information extraction method and a non-transitory computer readable medium storing a chord information extraction program that extract chord information efficiently from score image data.

A chord information extraction device according to one aspect of the present invention includes an acquirer configured to acquire score image data representing a reference score, a score type determiner configured to determine a score type of the reference score from among a plurality of predetermined score types based on the acquired score image data, an extraction region determiner configured to determine a chord extraction region, from which chord information is to be extracted, in the reference score based on extraction region information defining a relationship between the plurality of score types and a chord extraction region and a chord information extractor configured to extract the chord information from the acquired score image data based on the determined chord extraction region.

In an embodiment, the extraction region determiner may be configured to determine first and second extraction regions having different priority levels as the chord extraction regions, and the chord information extractor may be configured to determine presence or absence of the chord information in the first extraction region, and determine presence or absence of the chord information in the second extraction region in a case where the chord information is not present in the first extraction region. In an embodiment, the extraction region information may be configured to define a chord extraction region that differs depending on a score type.

In an embodiment, the score type determiner may be configured to determine a score type of the reference score based on whether the reference score includes one or a plurality of transverse lines constituting part of a music score as a score staff. In an embodiment, the score type determiner may be configured to determine a score type of the reference score based on whether the score staff is constituted by five transverse lines arranged in parallel with one another and at equal intervals. In an embodiment, the score type determiner may be configured to determine a score type of the reference score based on whether the reference score includes a plurality of the vertically arranged score staves and whether the score staves are connected to each other by a vertical line. In an embodiment, the score type determiner may be configured to determine a score type of the reference score based on whether the score staff is constituted by six transverse lines arranged in parallel with one another and at equal intervals.

A chord information extraction method according to another aspect of the present invention includes acquiring score image data representing a reference score, determining a score type of the reference score from among a plurality of predetermined score types based on the acquired score image data, determining a chord extraction region, from which chord information is to be extracted, in the reference score based on extraction region information defining a relationship between the plurality of score types and a chord extraction region and extracting the chord information from the acquired score image data based on the determined chord extraction region.

In an embodiment, the determining a chord extraction region may include determining first and second extraction regions having different priority levels as the chord extraction regions, and the extracting the chord information may include determining presence or absence of the chord information in the first extraction region, and determining presence or absence of the chord information in the second extraction region in a case where the chord information is not present in the first extraction region. In an embodiment, the extraction region information may be configured to define a chord extraction region that differs depending on a score type.

In an embodiment, the determining a score type may include determining a score type of the reference score based on whether the reference score includes one or a plurality of transverse lines that constitute part of the music score as a score staff. In an embodiment, the determining a score type may include determining the score type of the reference score based on whether the score staff is constituted by five transverse lines arranged in parallel with one another and at equal intervals. In an embodiment, the determining a score type may include determining the score type of the reference score based on whether the reference score includes a plurality of the vertically arranged score staves and whether the plurality of score staves are connected to each other by a vertical line. In an embodiment, the determining a score type may include determining the score type of the reference score based on whether the score staff is constituted by six transverse lines that are arranged in parallel with one another and at equal intervals.

A non-transitory computer readable medium according to yet another aspect of the present invention stores a chord information extraction program, wherein the chord information extraction program causes a computer to acquire score image data representing a reference score, determine a score type of the reference score from among a plurality of predetermined score types based on the acquired score image data, determine a chord extraction region, from which chord information is to be extracted, in the reference score based on extraction region information defining a relationship between the plurality of score types and chord extraction regions and extract the chord information from the acquired score image data based on the determined chord extraction region.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 3 is a diagram for explaining the relationship between each score type and each chord extraction region;

DESCRIPTION OF THE PREFERRED EMBODIMENTS

A chord information extraction device, a chord information extraction method and a non-transitory computer readable medium storing a chord information extraction program according to embodiments of the present invention will be described below in detail with reference to the drawings.

[1] Configuration of Chord Information Extraction Device

Figure 1:
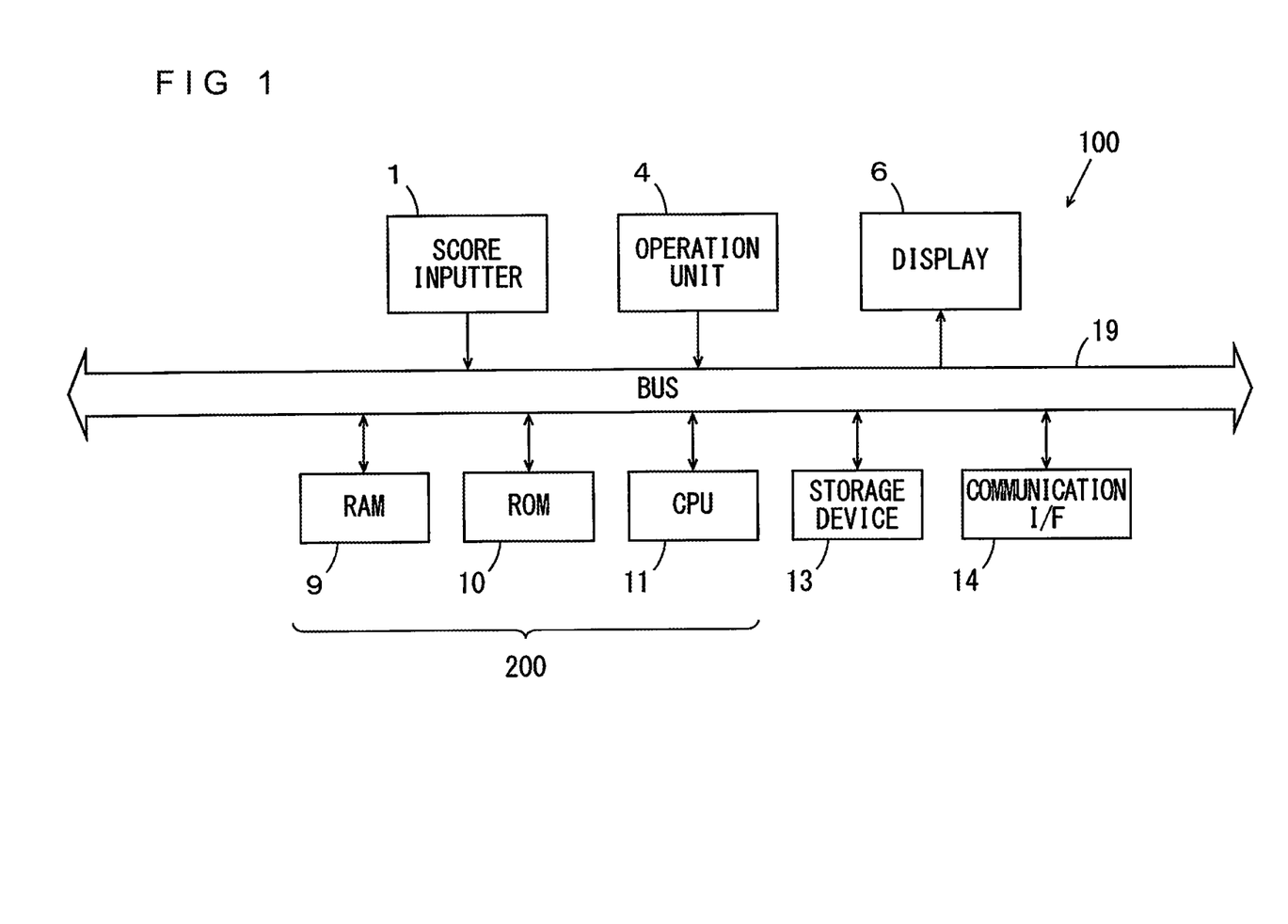
FIG. 1 is a block diagram showing the configuration of a chord information extraction device according to an embodiment of the present invention.

FIG. 1 is a block diagram showing the configuration of the chord information extraction device according to an embodiment of the present invention. The chord information extraction device 100 of FIG. 1 extracts the chord information representing a chord from score image data representing a music score.

The chord information extraction device 100 of FIG. 1 includes a score inputter 1, an operation unit 4, a display 6, a RAM (Random Access Memory) 9, a ROM (Read Only Memory) 10, a CPU (Central Processing Unit) 11, a storage device 13 and a communication I/F (interface) 14. These constituent elements are connected to a bus 19 respectively.

The score inputter 1 reads a music score printed on a recording medium such as a sheet of paper, and inputs the score image data representing the music score to the CPU 11. For example, the score inputter 1 is a scanner, and includes a light source and an optoelectronic transducer. The music score is irradiated with light from the light source, and the reflected light is received by the optoelectronic transducer. The optoelectronic transducer generates score image data based on the received light.

The operation unit 4 includes various operating elements to be operated by a user, and is used for on-off of a power supply and various settings. The display 6 includes a liquid crystal display, for example, and displays the extracted chord information. At least part of the operation unit 4 and the display 6 may be constituted by a touch panel display.

The RAM 9, the ROM 10 and the CPU 11 constitute a computer 200. The RAM 9 is a volatile memory, for example, which is used as a working area for the CPU 11, and temporarily stores various data. The ROM 10 is a non-volatile memory, for example, and stores computer programs such as a control program and the chord information extraction program. The CPU 11 executes the chord information extraction program stored in the ROM 10 on the RAM 9 to perform a chord information extraction process mentioned below.

The storage device 13 includes a storage medium such as a hard disc, an optical disc, a magnetic disc or a memory card. The storage device 13 stores extraction region information. Details of the extraction region information will be described below. One or a plurality of score image data pieces may be stored in the storage device 13, or the chord information extraction program may be stored in the storage device 13.

The communication I/F 14 can be connected to various external equipment such as an external storage device. Further, the communication I/F 14 may be connected to a communication network. In a case where the communication I/F 14 is connected to an external storage device, at least one of the chord information extraction program, the score image data and the extraction region information may be stored in the external storage device.

The chord information extraction program in the present embodiment may be supplied in the form of being stored in a storing media which is readable by a computer, and installed in the ROM 10 or the storage device 13. In addition, in a case where the communication I/F 14 is connected to a communication network, the chord information extraction program delivered from a server connected to the communication network may be installed in the ROM 10 or the storage device 13. Similarly, at least one of the score image data and the extraction region information may be acquired from the storage medium or may be acquired from the server connected to the communication network.

[2] Functional Configuration of Chord Information Extraction Device

Figure 2:
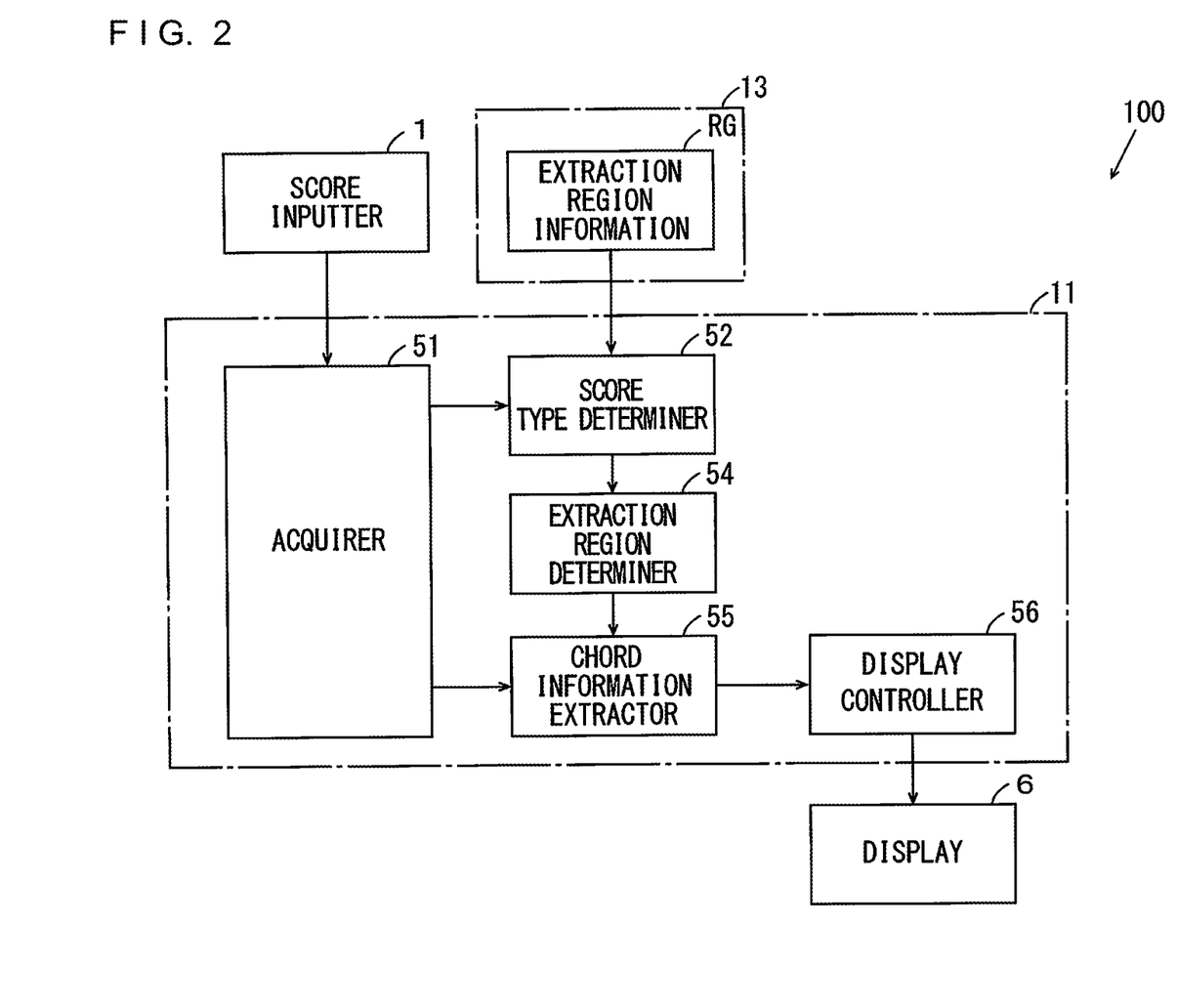
FIG. 2 is a block diagram showing the functional configuration of the chord information extraction device.

FIG. 2 is a block diagram showing the functional configuration of the chord information extraction device 100. As shown in FIG. 2, the chord information extraction device 100 includes an acquirer 51, a score type determiner 52, an extraction region determiner 54, a chord information extractor 55 and a display controller 56. The CPU 11 of FIG. 1 executes the chord information extraction program, whereby the functions of these constituent elements are realized.

The acquirer 51 acquires the score image data input by the score inputter 1. The acquirer 51 may acquire the score image data from any of the storage device 13 of FIG. 1, the external storage device connected to the communication I/F 14 and the server connected to the communication network. Hereinafter, the score represented by the acquired score image data is referred to as a reference score. Further, a music piece corresponding to the reference score (a music piece played according to the reference score) is referred to as a reference music piece.

The score type determiner 52 determines the score type of the reference score from among a plurality of predetermined score types based on the acquired score image data. The score type represents the type of a score. The score type includes a lead sheet, a piano score, a tablature score, a guitar chord score and a text chord score, for example. Specific examples of these score types will be described below.

The extraction region determiner 54 determines a chord extraction region in the reference score based on extraction region information RG stored in the storage device 13. The chord extraction region is a region from which chord information is extracted. As described below, every score type has a certain tendency as to a position where the chord information is notated. Therefore, the relationship between the score type and the chord extraction region is predetermined as the extraction region information RG. In the present example, the extraction region information RG defines the relative positional relationship between an index serving as a reference in a music score (hereinafter referred to as a score index) and the chord extraction region in regard to each score type.

The chord information extractor 55 extracts the chord information from the acquired score image data based on the determined chord extraction region. Specifically, the chord information extractor 55 determines the presence or absence of the chord information in the chord extraction region based on the score image data. Then, in a case where the chord information is notated in the chord extraction region, the chord information extractor 55 extracts the chord information from the score image data. The chord information is notated by a chord name, for example.

The display controller 56 controls the display 6 such that the extracted chord information is displayed. For example, the display controller 56 causes a text chord score (see FIG. 5 described below) including the extracted chord information to be displayed on the screen of the display 6.

[3] Relationship Between Score Type and Chord Extraction Region

Figure 4:
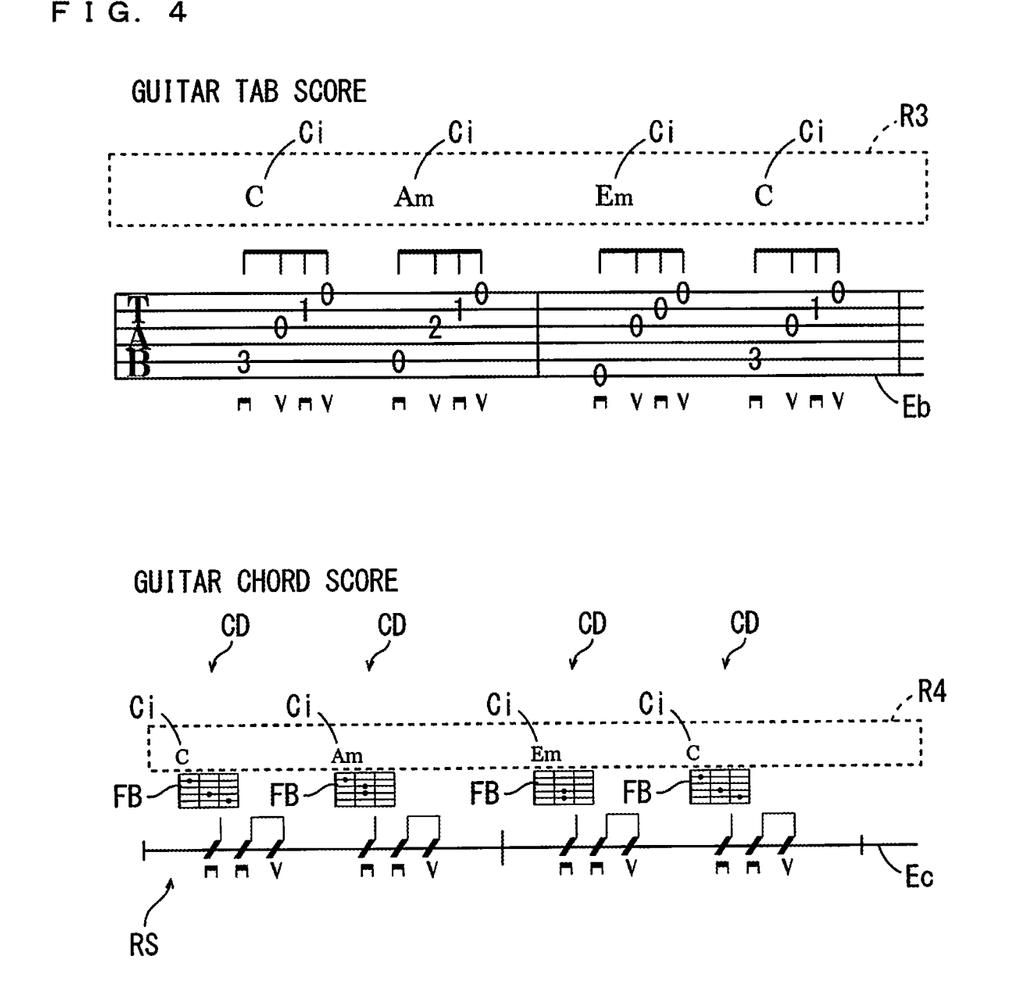
FIG. 4 is a diagram for explaining the relationship between each score type and each chord extraction region.
Figure 5:
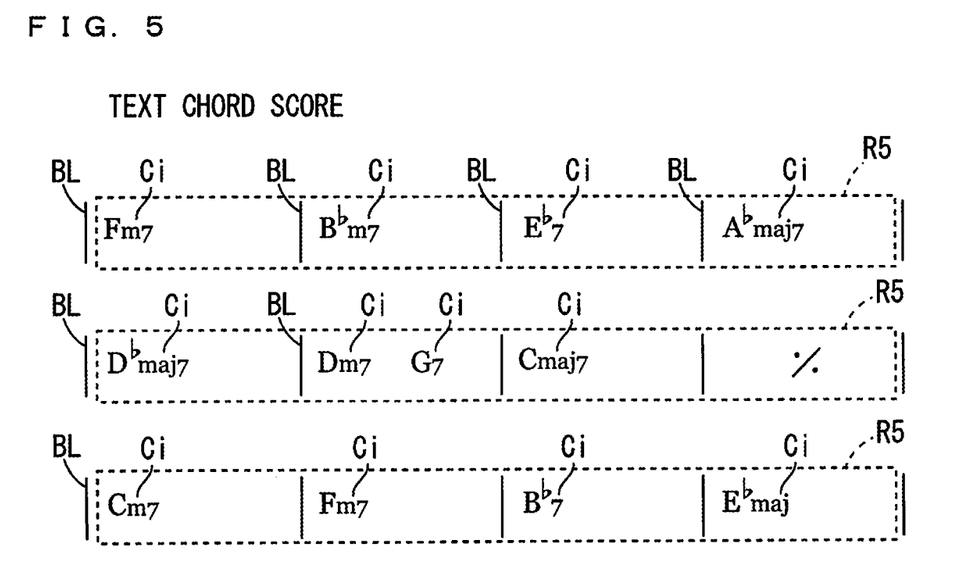
FIG. 5 is a diagram for explaining the relationship between a score type and a chord extraction region.

FIGS. 3, 4 and 5 are diagrams for explaining the relationship between the score type and the chord extraction region. In the examples of FIGS. 3 to 5, each chord information piece is notated by a chord name. FIG. 3 shows examples of a lead sheet and a piano score. The lead sheet of FIG. 3 includes a five-line staff Ea and at least one chord information piece Ci. While only one five-line staff Ea is shown in FIG. 3, a plurality of five-line staves Ea may be arranged vertically. Each five-line staff Ea is constituted by five transverse lines (horizontal lines) arranged in parallel with one another and at equal intervals. Normally, a note sequence of any part (a melody part, for example) of a reference music piece is arranged on the five-line staff Ea. Lyrics of the reference music piece may be notated in a region below the five-line staff Ea.

Each chord information piece Ci is normally notated at a position above and vertically adjacent to the five-line staff Ea. Therefore, a region R1 within a predetermined range above each five-line staff Ea is determined as the chord extraction region, for example. In this case, the extraction region information RG defines that each five-line staff Ea is a score index, and defines the relative positional relationship between each five-line staff Ea and the region R1, in regard to the lead sheet.

The piano score of FIG. 3 includes a five-line staff pair Ep and least one chord information Ci. Each five-line staff pair Ep includes an upper five-line staff Ea and a lower five-line staff Ea. While only one five-line staff pair Ep is shown in FIG. 3, a plurality of five-line staff pairs Ep may be arranged vertically. A specific vertical line such as a barline extends continuously and vertically so as to connect the upper five-line staff Ea and the lower five-line staff Ea of the five-line staff pair Ep to each other. A pair of measures that are adjacent to each other in the vertical direction in each five-line staff pair Ep represents the same section in the reference musical piece.

Each chord information piece Ci is normally notated at a position above and vertically adjacent to the upper five-line staff Ea included in the five-line staff pair Ep. Therefore, a region R2 within a predetermined range above each five-line staff pair Ep is determined as the chord extraction region, for example. In this case, the extraction region information RG defines that each five-line staff pair Ep is a score index, and defines the relative positional relationship between each five-line staff pair Ep and the region R2, in regard to the piano score.

FIG. 4 shows the examples of a tablature score and a guitar chord score. The tablature score of FIG. 4 is a tablature score for a guitar (hereinafter referred to as a guitar tab score). The guitar tab score includes a six-line staff Eb and at least one chord information. The six-line staff Eb is constituted by six transverse lines that are arranged in parallel with one another and at equal intervals. These six transverse lines correspond to six strings of a guitar, respectively. While only one six-line staff Eb is shown in FIG. 4, a plurality of six-line staves Eb may be arranged vertically.

Each chord information piece Ci is normally notated at a position above and vertically adjacent to the six-line staff Eb. Therefore, a region R3 within a predetermined range above each six-line staff Eb is determined as the chord extraction region, for example. In this case, the extraction region information RG defines that each six-line staff Eb is a score index, and defines the relative positional relationship between each six-line staff Eb and the region R3, in regard to the guitar tab score.

The guitar chord score of FIG. 4 includes a rhythm score RS and at least one chord diagram CD. The rhythm score RS has the structure in which notes representing rhythm are arranged on one transverse line (hereinafter referred to as a rhythm staff Ec). While one rhythm score RS is shown in FIG. 4, a plurality of rhythm scores RS may be provided. Each chord diagram CD is normally notated at a position above and adjacent to the rhythm staff Ec. Each chord diagram CD includes the chord information Ci and a fingerboard diagram FB partially showing a fingerboard of a guitar. The fingerboard diagram FB shows a string and a position on the fingerboard to which finger pressure is to be applied when the chord represented by the chord information Ci is played.

In each chord diagram CD, the chord information Ci is notated at a position farther upward than the left portion of each fingerboard diagram FB. Therefore, a region R4 within a predetermined range above each rhythm staff Ec and above one or a plurality of fingerboard diagrams FB is determined as the chord extraction region, for example. In this case, the extraction region information RG defines that each rhythm staff Ec is a score index, and defines the relative positional relationship between each rhythm staff Ec and the region R4, in regard to the guitar chord score. Alternatively, each fingerboard diagram FB may be used as a score index, and the region above each fingerboard diagram FB may be determined as the chord extraction region.

FIG. 5 shows an example of the text chord score. The text chord score of FIG. 5 includes a plurality of barlines BL and at least one chord information piece Ci arranged in each of a plurality of fields arranged in the vertical direction. Each chord information piece Ci is normally arranged in the region between two barlines BL adjacent to each other in the horizontal direction. Therefore, a region R5 within a predetermined range between the barline BL positioned at the left end of each field and the barline BL positioned at the right end of each field is determined as the chord extraction region, for example. In this case, the extraction region information RG defines that a pair of barlines BL positioned at the left and the right ends of each field is a score index, and defines the relative positional relationship between the pair of barlines BL and the region R5, in regard to the text chord score. Alternatively, each barline BL may be used as a score index, and the region between two barlines BL adjacent to each other in the horizontal direction may be determined as the chord extraction region.

In this manner, every score type has a certain tendency as to a position where the chord information Ci is notated. Therefore, the extraction region information RG defines the relative positional relationship between the score index and the chord extraction region such that the chord information Ci is included in the chord extraction region, in regard to each score type. As shown in the examples of FIGS. 3 to 5, the chord information pieces Ci are normally notated to be arranged in the horizontal direction for any score type. Therefore, in the example of FIGS. 3 to 5, an elongated region extending in the horizontal direction is determined as the chord extraction region.

[4] Extraction of Chord Information

Figure 6:
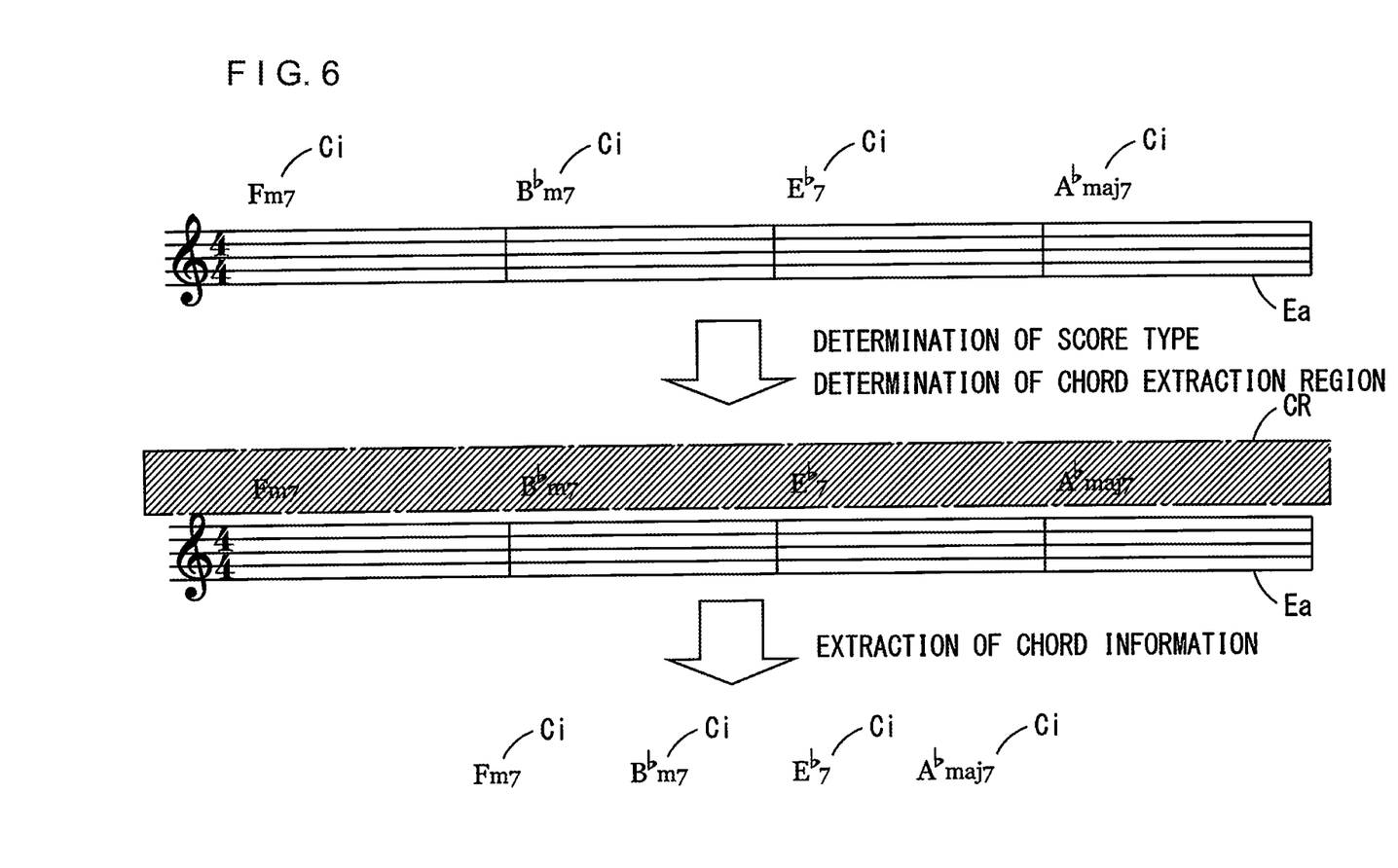
FIG. 6 is a diagram for explaining an example of extraction of chord information.

The outline of extraction of the chord information from the score image data will be explained by way of example in a case where the reference score is a lead sheet. FIG. 6 is a diagram for explaining an example of extraction of chord information. In the upper field of FIG. 6, one five-line staff Ea of a lead sheet, which is the reference score, is shown. Notes on each five-line staff Ea are not shown.

First, the score type of the reference score is determined. For example, binarization processing, inclination correction and the like of the score image data input by the score inputter 1 of FIG. 1 are performed. Then, various information relating to a five-line staff, a six-line staff, a rhythm staff, a barline and the like are detected based on luminance distribution in the vertical and horizontal directions, and the score type is determined based on the information. Alternatively, the score image data may be compressed, and the score type may be determined by an image recognition method using machine learning such as a convolutional neural network. A specific method of determining the score type will be described below. In the example of FIG. 6, it is determined that the score type of the reference score is a lead sheet.

Subsequently, as shown in the middle field of FIG. 6, the chord extraction region CR in the reference score is determined based on the extraction region information RG. As described above, the extraction region information RG defines the relative positional relationship between each five-line staff Ea and the chord extraction region CR in regard to the lead sheet. In the present example, the chord extraction region CR of the lead sheet is a rectangular region above each five-line staff Ea.

For example, the position of the upper side of the chord extraction region CR is set at a position farther upward than the fifth line (the transverse line located at the uppermost position) of the detected five-line staff Ea by a predetermined upper-side distance, and the position of the lower side of the chord extraction region CR is set at a position farther upward than the fifth line of the detected five-line staff Ea by a predetermined lower-side distance. The position of the left side of the chord extraction region CR is set at a position farther leftward than the position of the left end of the detected five-line staff Ea by a predetermined left-side distance, and the position of the right side of the chord extraction region CR is set at a position farther rightward than the position of the right end of the detected five-line staff Ea by a predetermined right-side distance. The left and right sides of the chord extraction region CR are preferably and respectively located at positions farther leftward and rightward than the left and right end of the five-line staff Ea by a predetermined distance such that the chord information Ci is included in the chord extraction region CR even in a case where the chord information Ci is located at a position farther leftward or rightward than the left or right end of the five-line staff Ea.

The upper-side distance and the lower-side distance may be defined to depend on the vertical dimension of the detected five-line staff Ea. Similarly, the left-side distance and the right-side distance may be defined to depend on the horizontal dimension of the detected five-line staff Ea. Alternatively, the distance between the plurality of vertically arranged five-line staves Ea may be detected, and the vertical dimension of the chord extraction region CR may be determined based on the distance.

The chord information Ci is extracted from the score image data based on the chord extraction region CR that is determined in this manner. For example, the luminance distribution of the chord extraction region CR is acquired from the score image data, and the chord information Ci is extracted based on the luminance distribution. In the example of FIG. 6, "$Fm_7$," "$B^bm_7$," "$E^b_7$" and "$A^bmaj_7$" which are character groups representing chord names, are extracted as the chord information Ci. Each character group representing the chord name includes alphabets, numbers and various symbols.

Normally, each character in the character group representing a chord name is integrally formed and does not include a plurality of separated parts. For example, in regard to "$B^bm_7$," "B," "$^b$," "m" and "$_7$" are integrally formed. That is, all parts constituting each character are connected to one another. Therefore, in the score image data, each of the characters representing a chord name can be accurately extracted with reference to the portion in which the luminance largely changes.

Also in a case where the reference score is another score type, the score type is similarly determined based on the score image data, the chord extraction region fitted to the score type is determined based on the extraction region information RG, and the chord information Ci is extracted from the score image data based on the determined chord extraction region. In a case where the chord information Ci is not notated in the determined chord extraction region CR, the error information representing that the chord information Ci is not extracted from the reference score may be displayed in the display 6.

The time position in the reference music piece corresponding to each chord information piece Ci may be acquired based on the position in which each chord information piece Ci is notated in the reference score. For example, in a case where the reference score includes a barline, the time position of each chord information piece Ci in the reference music piece can be specified based on the positional relationship between each chord information piece Ci and the barline. The time position is represented by a measure number, a beat and a tick, for example. In this case, based on the acquired time position, the extracted chord information Ci can be displayed easily and efficiently, automatic accompaniment data or the like on the basis of the extracted chord information Ci can be generated easily and efficiently.

Information, other than chord information Ci, for example, a note, a rehearsal mark or a measure number may be notated in the determined chord extraction region CR. Therefore, the chord information Ci is preferably distinguished from the information other than the chord information Ci such that the other information is not erroneously extracted as the chord information Ci. For example, the notation rule of the chord information Ci may be predetermined, and the information that does not follow the notation rule may be excluded from the information to be extracted.

Figure 7:
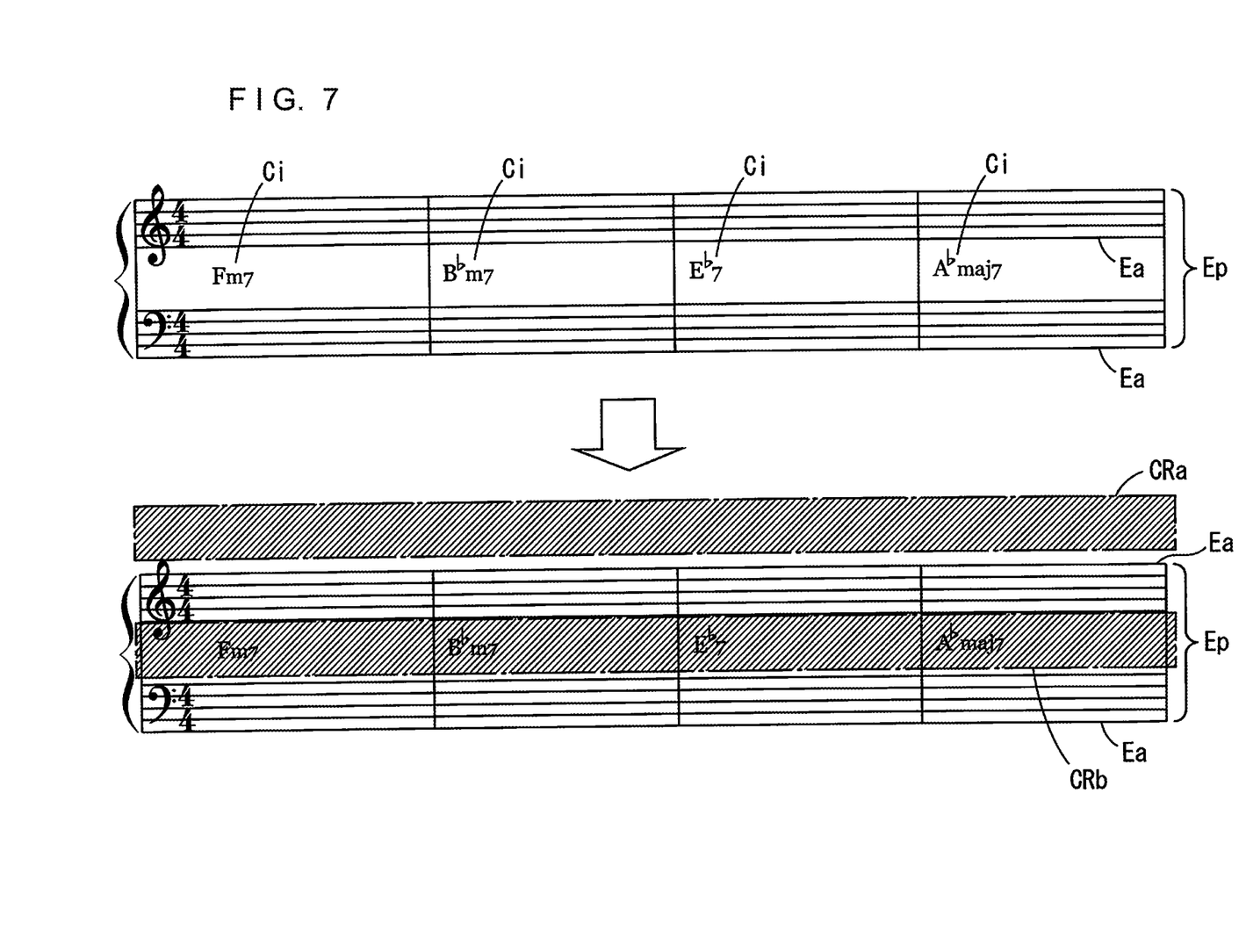
FIG. 7 is a diagram for explaining another example of determination of the chord extraction region.

There may be a plurality of variations in positions in which the chord information Ci is notated depending on the score type. As such, a plurality of patterns of chord extraction regions may be determined so as to correspond to such a plurality of variations. FIG. 7 is a diagram for explaining another example of determination of a chord extraction region. FIG. 7 shows one example of a piano score. While the chord information Ci is normally notated in the region above each five-line staff pair Ep as shown in the example of FIG. 3 in a piano score, the chord information Ci may be notated between the upper five-line staff Ea and the lower five-line staff Ea of a five-line staff pair Ep as shown in the example of FIG. 7.

As such, first and second regions having different priority levels may be set respectively as chord extraction regions CR. The priority level of the first region is higher than that of the second region. First, presence or absence of notation of chord information Ci in the first region is determined. In a case where being detected in the first region, the chord information Ci is extracted. On the other hand, in a case where the chord information Ci is not present in the first region, presence or absence of notation of the chord information Ci in the second region is subsequently determined. In a case where being detected in the second region, the chord information Ci is extracted.

In the lower example of FIG. 7, the region above a five-line staff pair Ep (the region above an upper five-line staff Ea) is determined as a first region CRa, and the region between the upper five-line staff Ea and a lower five-line staff Ea is determined as a second region CRb. In this case, presence or absence of the chord information Ci in the first region CRa is determined first. Then, because the chord information Ci is not notated in the first region CRa, presence or absence of the chord information Ci in the second region CRb is determined. In this case, because the chord information Ci is notated in the second region CRb, the chord information Ci in the second region CRb is extracted from the score image data.

In this manner, even in a case where chord information Ci not present in the first region CRa, when the chord information Ci is present in the second region CRb, the chord information Ci can be extracted from the score image data. Thus, even in a case where there are a plurality of variations in positions in which the chord information is notated for the determined score type, the chord information Ci can be appropriately extracted from the score image data.

In the example of FIG. 7, the first and second regions having different priority levels are determined as the chord extraction regions, and presence or absence of the chord information Ci is determined in two stages in the first and second regions. However, three or more than three regions with different priority levels may be set, and presence or absence of the chord information Ci may be determined in three or more than three stages in these regions.

[5] Chord Information Extraction Process

Figure 8:
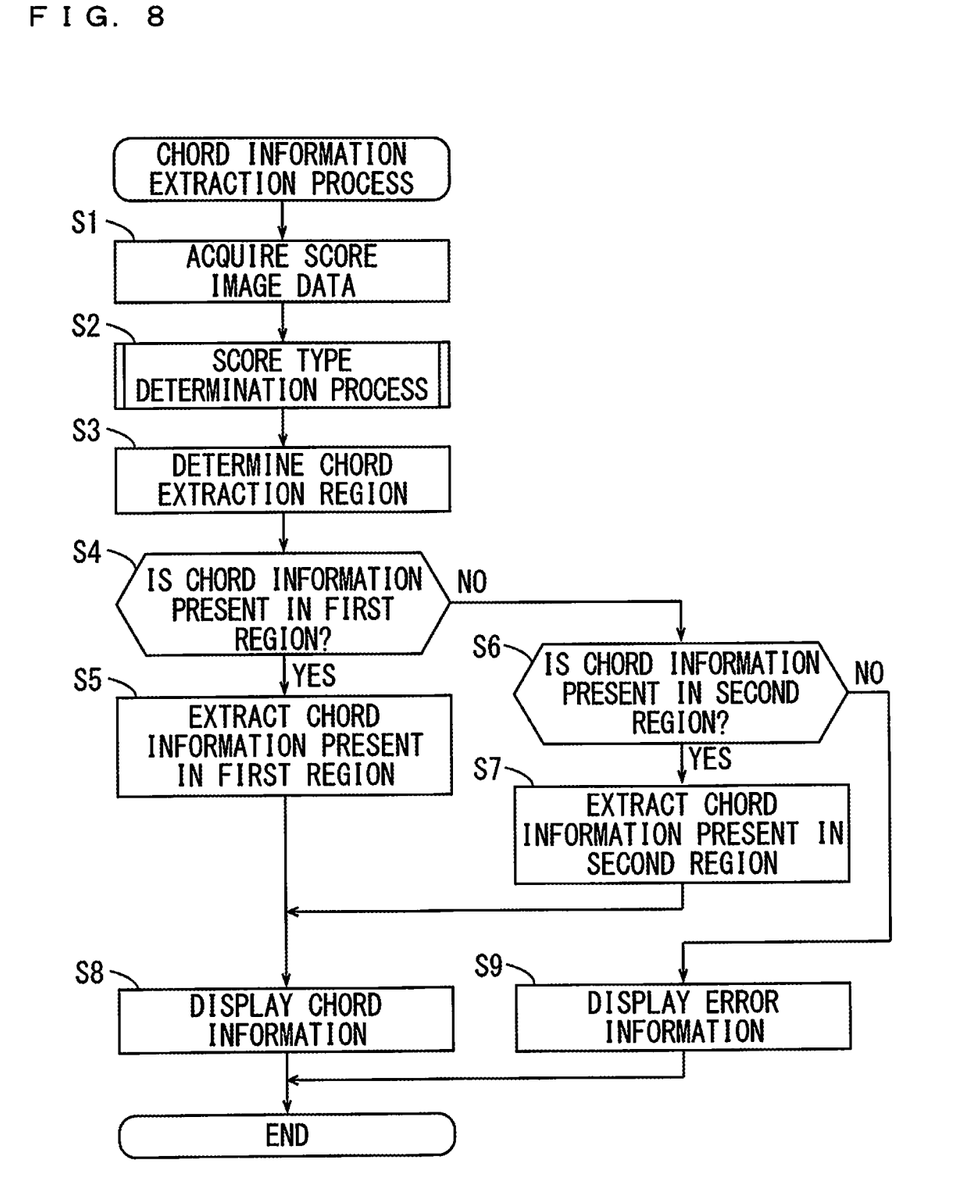
FIG. 8 is a flowchart showing one example of a chord information extraction process.

Next, the chord information extraction process using the chord information extraction method according to the present embodiment will be described. FIG. 8 is a flowchart showing one example of the chord information extraction process performed by each function of FIG. 2. The CPU 11 of FIG. 1 executes the chord information extraction program stored in the ROM 10 or the storage device 13 to perform the chord information extraction process of FIG. 8.

First, the acquirer 51 acquires the score image data input by the score inputter 1 (step S1). Next, the score type determiner 52 performs a score type determination process for determining the score type of a reference score (step S2). Details of the score type determination process will be described below. Next, the extraction region determiner 54 determines a chord extraction region in the reference score based on the determined score type and the extraction region information RG stored in the storage device 13 (step S3). For example, the extraction region determiner 54 detects a score index corresponding to the determined score type from the score image data, and sets the chord extraction region in the reference score such that the chord extraction region has a predetermined positional relationship with the score index. In the present example, the extraction region determiner 54 determines first and second regions having different priority levels as the chord extraction regions.

Next, the chord information extractor 55 determines whether the chord information is present in the determined first region (step S4). In a case where the chord information is present in the first region, the chord information extractor 55 extracts the chord information from the score image data (step S5) and proceeds to the step S8. On the other hand, in a case where the chord information is not present in the first region, the chord information extractor 55 determines whether the chord information is present in the determined second region (step S6). In a case where the chord information is present in the second region, the chord information extractor 55 extracts the chord information from the score image data (step S7) and proceeds to the step S8.

In the step S8, the display controller 56 controls the display 6 such that the extracted chord information is displayed (step S8). On the other hand, in a case where the chord information is not present in the second region in the step S6, the display controller 56 controls the display 6 such that the error information, representing that the chord information has not been extracted, is displayed (step S9). Then, the chord information extraction process ends.

A specific example of the score type determination process in the step S2 will be described. In the present example, various information such as a five-line staff, a six-line staff, a rhythm staff and measures is detected from the score image data acquired in the step S1 of FIG. 8, and the score type is determined based on the information. In the following description, the five-line staves Ea in FIG. 3, and the six-line staff Eb and the rhythm staff Ec in FIG. 4 are collectively referred to as a score staff. The score staff is one or a plurality of transverse lines that constitute part of a music score and represents the elapse of time in a reference music piece.

The musical symbols such as first and second endings used in combination with a crescendo, a decrescendo and a repeat mark may include horizontal or nearly horizontal and relatively long straight lines. Therefore, it is preferable that these musical symbols are distinguished from a score staff (a rhythm staff, for example). The score staff can be distinguished from these musical symbols based on the length of a straight line or parallelism and a spacing between a plurality of vertically arranged straight lines, for example.

Figure 9:
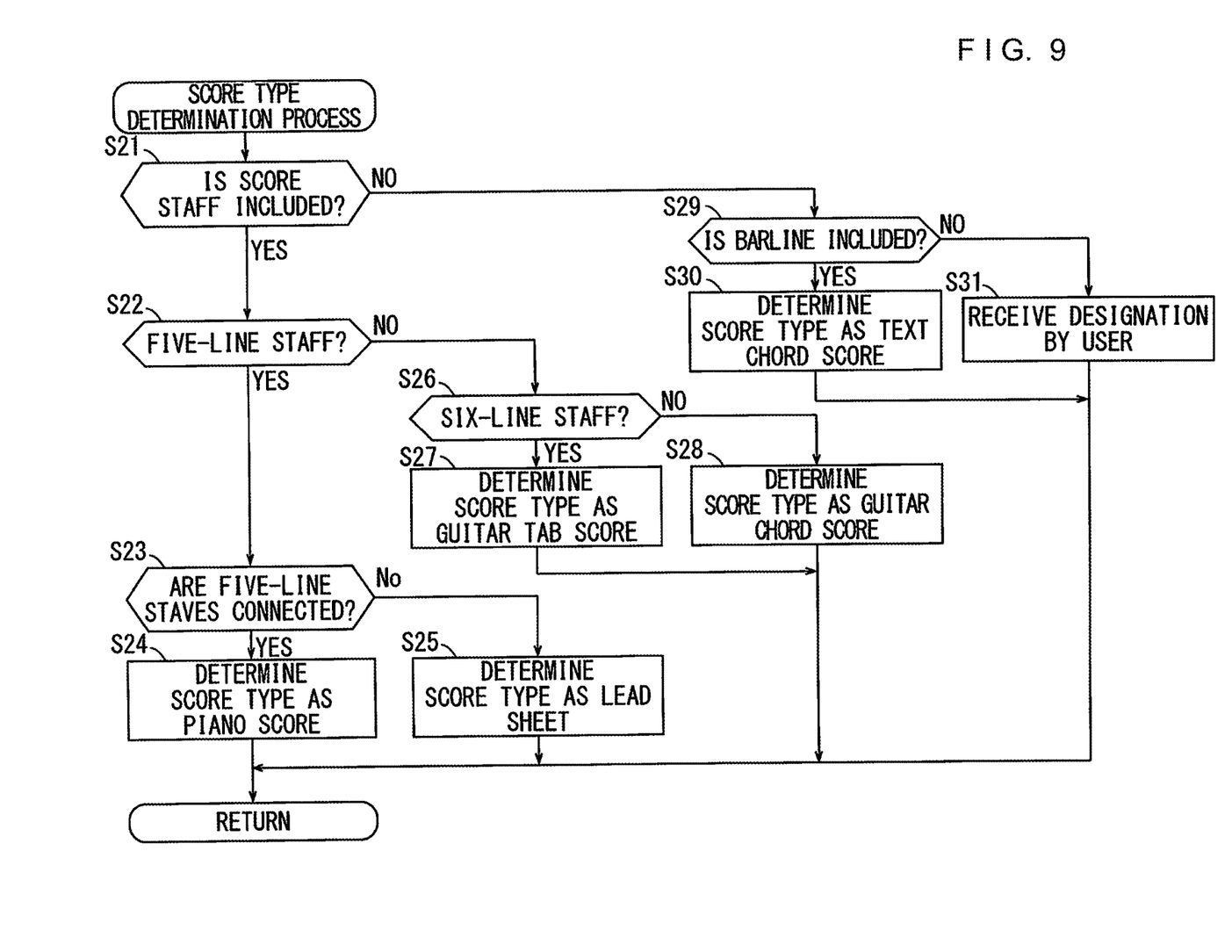
FIG. 9 is a flowchart showing one example of a score type determination process.

FIG. 9 is a flowchart showing one example of the score type determination process performed by the score type determiner 52. First, the score type determiner 52 determines whether the reference score includes a score staff based on the score image data (step S21). In a case where the reference score includes a score staff, the score type determiner 52 determines whether the score staff is constituted by five transverse lines, that is, determines whether the score staff is a five-line staff (step S22). In a case where the score staff is a five-line staff, the score type determiner 52 determines whether the reference score includes a plurality of vertically arranged five-line staves, and determines whether two five-line staves that are adjacent to each other in the vertical direction are connected to each other (step S23).

As shown in the example of FIG. 3, a pair of five-line staves Ea is normally connected to each other by a barline or the like in a piano score. Therefore, in a case where two five-line staves vertically adjacent to each other in the vertical direction are connected to each other, the score type determiner 52 determines that the score type of the reference score is a piano score (step S24). On the other hand, as shown in the example of FIG. 3, one five-line staff is normally not connected to another five-line staff in a lead sheet. Therefore, in a case where the reference score does not include a plurality of five-line staves, or two five-line staves that are adjacent to each other in the vertical direction are not connected to each other, the score type determiner 52 determines that the score type of the reference score is a lead sheet (step S25).

In a case where the score staff is not a five-line staff in the step S22, the score type determiner 52 determines whether the score staff is constituted by six transverse lines, that is, determines whether the score staff is a six-line staff (step S26). In a case where the score staff is a six-line staff, the score type determiner 52 determines that the score type of the reference score is a guitar tab score (step S27). In a case where the score staff is not a six-line staff, the score type determiner 52 determines that the detected score staff is a rhythm staff, and determines that the score type of the reference score is a guitar chord score (step S28). In a case where the score staff is not a six-line staff in the step S26, whether the score type of the reference score is a guitar chord score may be determined based on presence or absence of a note, and presence or absence of a chord diagram, on the score staff. In a case where neither a note nor a chord diagram is detected on the score staff, the score type determiner 52 may proceed to the step S31 mentioned below.

In a case where the reference score does not include a score staff in the step S21, the score type determiner 52 determines whether the reference score includes a barline (step S29). In a case where the reference score includes a barline, the score type determiner 52 determines that the score type of the reference score is a text chord score (step S30). In the meantime, either a score staff or a barline might not be detected from the score image data due to the difference in shading of the reference score or a stain and the like on the reference score. In that case, the score type determiner 52 receives the score type designated by the user (step S31). In this case, the score type determiner 52 determines that the score type of the reference score is the designated score type. Thus, the score type determination process ends.

In the example of FIG. 9, in a case where the reference score is any of a lead sheet, a piano score, a guitar tab score, a guitar chord score and a text chord score of FIGS. 3 to 5, the score type is determined based on the score image data. However, the score type is not limited to these examples. For example, in a lead sheet, an upper five-line staff Ea and a lower five-line staff Ea may be connected to each other as in a piano score, or three or more than three five-line staves Ea may be connected to each other. Further, a tablature score for a bass guitar includes four lines constituted by four transverse lines respectively corresponding to the four strings of a bass guitar instead of the six-line staff Eb of FIG. 4. Further, in a text chord score, the chord information might be notated on a five-line staff or a five-line staff pair. Alternatively, a barline might not be notated, and only chord information might be notated. There is also a score type in which a note is not represented, but lyrics and chord information are notated in parallel with each other. Further, there are a full score, a band score or the like in which various scores such as a lead sheet, a piano score, a tablature score and a rhythm score are combined.

Similarly to the example of FIG. 9, these score types can also be identified based on various information such as a score staff and a barline detected from the score image data. Further, every score type has a certain tendency as to a position where the chord information is notated. Thus, also in regard to these various score types, it is possible to determine a chord extraction region appropriately while using a score staff, a barline and the like as score indices.

[6] Effects of Embodiments

In the chord information extraction device 100 according to the present embodiment, the chord extraction region in the reference score is determined based on the extraction region information RG that defines the relationship between a plurality of score types and chord extraction regions from which the chord information is to be extracted. Since each score type has a certain tendency as to a position where the chord information is notated, it is possible to extract the chord information efficiently from the score image data by determining the chord extraction region corresponding to the score type of the reference score.

Further, in the present embodiment, the score type of the reference score is determined based on the presence or absence of a score staff, the presence or absence of a five-line staff, the presence or absence of a six-line staff, the connection among a plurality of score staves, and the like in the reference score. Thus, various score types represented by a lead sheet, a piano score, a guitar tab score and the like can be determined efficiently and appropriately.

[7] Other Embodiments

The determined score type may be changeable by a user. For example, the display 6 displays a type confirmation screen for confirming the determined score type. The user may be able to confirm the score type on the type confirmation screen, and may also be able to change the score type by operating the operation unit 4. Further, a plurality of score type candidates may be displayed on the display 6, and the user may be able to select one candidate from among the plurality of candidates. Similarly, the user may be able to change the determined chord extraction region. Further, the user may be able to select one chord extraction region from among the plurality of chord extraction region candidates.

While the extracted chord information is displayed on the screen of the display 6 in the above-mentioned embodiment, another process may be performed with use of the extracted chord information. For example, automatic accompaniment data for outputting automatic accompaniment may be generated based on the extracted chord information and its time position.

Information, other than the chord information, for example, a note, a barline, a repeat mark or a rehearsal mark may be extracted from the score image data. In that case, the chord information can be displayed in various manners based on the other information. Further, automatic accompaniment data can be accurately generated based on the chord information.

While the chord information extraction device 100 includes the score inputter 1 in the above-mentioned embodiment, the score inputter 1 may be used as an external device of the chord information extraction device 100.

The chord information extraction device 100 may be applied to an electronic musical instrument such as an electronic keyboard musical instrument, and may be applied to another electronic apparatus such as a personal computer, a smartphone or a tablet terminal.

A chord information extraction device may comprise a memory configured to store processor-executable instructions; and a processor configured to execute the processor-executable instructions stored in the memory to thereby realize: an acquirer configured to acquire score image data representing a reference score; a score type determiner configured to determine a score type of the reference score from among a plurality of score types based on the acquired score image data; an extraction region determiner configured to determine a chord extraction region, from which chord information is to be extracted, corresponding to the reference score based on extraction region information defining a relationship between the plurality of score types and the chord extraction region; and a chord information extractor configured to extract the chord information from the acquired score image data based on the determined chord extraction region.

While preferred embodiments of the present invention have been described above, it is to be understood that variations and modifications will be apparent to those skilled in the art without departing the scope and spirit of the present invention. The scope of the present invention, therefore, is to be determined solely by the following claims.

I claim:
1. A chord information extraction device comprising:
an acquirer configured to acquire score image data representing a reference score;
a score type determiner configured to determine a score type of the reference score from among a plurality of score types based on the acquired score image data;
an extraction region determiner configured to determine a chord extraction region, from which chord information is to be extracted, corresponding to the reference score based on extraction region information defining a relationship between the plurality of score types and the chord extraction region; and
a chord information extractor configured to extract the chord information from the acquired score image data based on the determined chord extraction region.
2. The chord information extraction device according to claim 1, wherein
the extraction region determiner is configured to determine the chord extraction region such that the chord extraction region includes a first extraction region and a second extraction region, and
the chord information extractor is configured to determine whether the chord information is present in the first extraction region, and in a case where the chord information extractor determines that the chord information is not present in the first extraction region, the chord information extractor is configured to determine whether the chord information is present in the second extraction region.
3. The chord information extraction device according to claim 1, wherein
the extraction region information defines respective relationships between the plurality of score types and a plurality of chord extraction regions respectively corresponding to the plurality of score types such that the plurality of chord extraction regions differ from each other.
4. The chord information extraction device according to claim 1, wherein
the score type determiner is configured to determine the score type of the reference score based on whether the reference score includes one transverse line or a plurality of transverse lines constituting part of a music score as a score staff.
5. The chord information extraction device according to claim 4, wherein
the score type determiner is configured to determine the score type of the reference score based on whether the score staff is constituted by five transverse lines arranged in parallel with one another and at equal intervals.
6. The chord information extraction device according to claim 4, wherein
the score type determiner is configured to determine the score type of the reference score based on whether the reference score includes a plurality of the vertically arranged score staves and whether the score staves are connected to each other by a vertical line.
7. The chord information extraction device according to claim 4, wherein
the score type determiner is configured to determine the score type of the reference score based on whether the score staff is constituted by six transverse lines arranged in parallel with one another and at equal intervals.

8. The chord information extraction device according to claim 1, wherein
the extraction region determiner is configured to determine the chord extraction region corresponding to the reference score based on extraction region information defining a positional relationship between the score type of the reference score and the chord extraction region.

9. The chord information extraction device according to claim 1, wherein
the extraction region determiner is configured to determine the chord extraction region corresponding to the reference score based on extraction region information defining a positional relationship between a score index of the reference score and the chord extraction region, the score index and the chord extraction region being different regions of the reference score from each other.

10. A chord information extraction method including:
acquiring score image data representing a reference score;
determining a score type of the reference score from among a plurality of score types based on the acquired score image data;
determining a chord extraction region, from which chord information is to be extracted, corresponding to the reference score based on extraction region information defining a relationship between the plurality of score types and the chord extraction region; and
extracting the chord information from the acquired score image data based on the determined chord extraction region.

11. The chord information extraction method according to claim 10, wherein
the determining a chord extraction region includes determining a first extraction region and a second extraction region, and
the extracting the chord information includes determining whether the chord information is present in the first extraction region, and in a case where it is determined that the chord information is not present in the first extraction region, determining whether the chord information is present in the second extraction region.

12. The chord information extraction method according to claim 10, wherein
the extraction region information defines respective relationships between the plurality of score types and a plurality of chord extraction regions respectively corresponding to the plurality of score types such that the plurality of chord extraction regions differ from each other.

13. The chord information extraction method according to claim 10, wherein
the determining a score type includes determining the score type of the reference score based on whether the reference score includes one transverse line or a plurality of transverse lines that constitute part of the music score as a score staff.

14. The chord information extraction method according to claim 13, wherein
the determining a score type includes determining the score type of the reference score based on whether the score staff is constituted by five transverse lines arranged in parallel with one another and at equal intervals.

15. The chord information extraction method according to claim 13, wherein
the determining a score type includes determining the score type of the reference score based on whether the reference score includes a plurality of the vertically arranged score staves and whether the plurality of score staves are connected to each other by a vertical line.

16. The chord information extraction method according to claim 13, wherein
the determining a score type includes determining the score type of the reference score based on whether the score staff is constituted by six transverse lines that are arranged in parallel with one another and at equal intervals.

17. A non-transitory computer readable medium storing a chord information extraction program that, when executed by a computer, causes the computer to:
acquire score image data representing a reference score;
determine a score type of the reference score from among a plurality of score types based on the acquired score image data;
determine a chord extraction region, from which chord information is to be extracted, corresponding to the reference score based on extraction region information defining a relationship between the plurality of score types and the chord extraction region; and
extract the chord information from the acquired score image data based on the determined chord extraction region.

* * * * *